(12) United States Patent
Lin

(10) Patent No.: US 11,500,434 B2
(45) Date of Patent: Nov. 15, 2022

(54) AIR COOLING STRUCTURE OF COMPUTER CHASSIS

(71) Applicant: EDAC ELECTRONICS TECHNOLOGY (HANGZHOU) CO., LTD, Hangzhou (CN)

(72) Inventor: Huantang Lin, Hangzhou (CN)

(73) Assignee: EDAC ELECTRONICS TECHNOLOGY (HANGZHOU) CO., LTD, Hangzhou (CN)

( * ) Notice: Subject to any disclaimer, the term of this patent is extended or adjusted under 35 U.S.C. 154(b) by 23 days.

(21) Appl. No.: 17/189,469

(22) Filed: Mar. 2, 2021

(65) Prior Publication Data

US 2022/0236776 A1 Jul. 28, 2022

(30) Foreign Application Priority Data

Jan. 28, 2021 (CN) .......................... 202120238227.5

(51) Int. Cl.
*G06F 1/20* (2006.01)
*G06F 1/18* (2006.01)

(52) U.S. Cl.
CPC ................ *G06F 1/20* (2013.01); *G06F 1/183* (2013.01); *G06F 2200/201* (2013.01)

(58) Field of Classification Search
CPC . G06F 1/20; G06F 1/203; G06F 1/183; G06F 2200/201
See application file for complete search history.

(56) References Cited

U.S. PATENT DOCUMENTS

| | | | |
|---|---|---|---|
| 6,362,968 B1* | 3/2002 | Lajara ................. | H05K 7/1461 361/752 |
| 6,597,569 B1* | 7/2003 | Unrein ...................... | G06F 1/20 361/679.54 |
| 7,324,338 B1* | 1/2008 | Chi ........................... | G06F 1/20 361/679.48 |
| 7,885,062 B2* | 2/2011 | Wagner .............. | H05K 7/20727 361/679.49 |
| 8,416,567 B2* | 4/2013 | Cheng ....................... | G06F 1/20 361/679.48 |
| 10,133,322 B1* | 11/2018 | Bouve .................... | H01L 23/427 |
| 2011/0110029 A1* | 5/2011 | Lodhia ..................... | G06F 1/20 361/679.46 |
| 2011/0182024 A1* | 7/2011 | Nihashi .................... | G06F 1/20 361/679.48 |
| 2014/0211410 A1* | 7/2014 | Cary ......................... | G06F 1/20 361/679.6 |
| 2016/0291650 A1* | 10/2016 | Lee ....................... | G06F 1/1626 |
| 2019/0073005 A1* | 3/2019 | Han ....................... | G06F 1/181 |

\* cited by examiner

*Primary Examiner* — Stephen S Sul
(74) *Attorney, Agent, or Firm* — Jeenam Park

(57) ABSTRACT

An air cooling structure of computer chassis includes: a first chassis, a second chassis, a third chassis, a computer motherboard, and a cooling fan; wherein, the first chassis, the second chassis, and the third chassis are provided in turn; the computer motherboard is provided in the first chassis, a CPU is provided on the side surface of the computer motherboard towards the second chassis, a peripheral interface is provided on the side surface of the computer motherboard far away from the second chassis, a cooling hole is provided on the second chassis, the cooling fan is provided in the second chassis, a graphics card is provided in the third chassis. Because of the openness and specific function of the middle-zone cooling system, the disclosure, the cooling becomes more efficient.

3 Claims, 4 Drawing Sheets

AIR COOLING STRUCTURE OF COMPUTER CHASSIS

CROSS-REFERENCE TO RELATED APPLICATIONS

This is a U.S. patent application which claims the priority and benefit of Chinese patent application number 202120238227.5, filed on Jan. 28, 2021, the disclosure of which is incorporated herein by reference in its entirety.

TECHNICAL FIELD

The disclosure relates to the field of computer chassis, in particular, relates to an air cooling structure of a computer chassis.

BACKGROUND

Computers and servers typically perform some kind of specifications in the industry. Although a significant number of them takes heat dissipation into account, it does not mean that there is no improvement in these specifications. Computer cooling in the art basically install the radiators and fans where there are heating parts to discharge heat out of the computer chassis through the system fan, therefore it is complex and low performance to dissipate heat.

Data centers, for example, have a full life cycle of 20 years, the construction cost in its early stage only accounts for about 20 percent of the total cost, while the rest of 80 percent is operation cost, and more than 80 percent of operation cost is electricity cost. IT equipment and cooling systems are already recognized as power-gobbling part, the current industry perspective is cooling power consumption accounting for more than 40%. The quality of the cooling system directly affects the overall efficiency of the data center.

The high-power components in the computer system is distributed at depression locations, which is the root cause of the above problems, and often forms hot spots in different zones of the system. In the sealing conditions of computer chassis, in order to dissipate heat, it is necessary to complete the drainage and discharge of two basic processes: the process of heat introduction, that is, the heat is introduced from the heat sources at the depression locations to computer chassis, and then discharged outside the system by the fan in the chassis. In the process of heat introduction, due to the influence and constraints from other components in the computer chassis, the process becomes quite complex, and these waste heat will accumulate in the computer chassis zone, so that it is more difficult to improve the cooling efficiency, and will have a negative impact on the stability and life of the surrounding components.

SUMMARY

The purpose of the disclosure is to provide an air cooling structure of a computer chassis, which is intended to solve the problems that the sealing characteristics of computer chassis in the art cause a low cooling efficiency, noise and energy consumption of an air cooling fan, and cooling safety of a water cooling, etc. . . . .

The embodiment of the disclosure is implemented in this way, an air cooling structure of the computer chassis includes: a first chassis, a second chassis, a third chassis, a computer motherboard, and a cooling fan; wherein the first chassis, the second chassis, and the third chassis are provided in turn; the computer motherboard is provided in the first chassis, a CPU is provided on the side surface of the computer motherboard towards the second chassis, a peripheral interface is provided on the side surface of the computer motherboard far away from the second chassis, a cooling hole is provided on the second chassis, the cooling fan is provided in the second chassis, a graphics card is provided in the third chassis.

Further, a hard disk is provided on the side face of the computer motherboard towards the second chassis.

Further, a hard disk is provided in the third chassis.

Because of the openness and specific function of the middle-zone cooling system of the disclosure, the cooling becomes more efficient. At the same time, the cooling mode will not be limited by other systems, and the cooling measures becomes more flexible and diverse, so that the adverse effects on electronic components caused by system waste heat aggregation and cooling effect are fundamentally eliminated, which can greatly improve the maintenance efficiency of the system, facilitate the expansion and capacity of the computer system, and greatly reduce the cost of building the computing system engineering. In addition, the throughway middle zone is easier to plan unimpeded wind channels, can reflect a higher safe and reliable value if the water cooling system is used. Heat components, such as graphics cards, and hard disks etc. . . . , could be arranged on the other side of the middle-zone cooling system so as to make the middle-zone cooling system more efficiently. The above-mentioned zone isolation and openness can be directly expanded and combined to form a large-scale computing system, all kinds of line planning is more concise, the construction costs and operating and maintenance difficulties of the computer room are greatly reduced.

Figure 1:
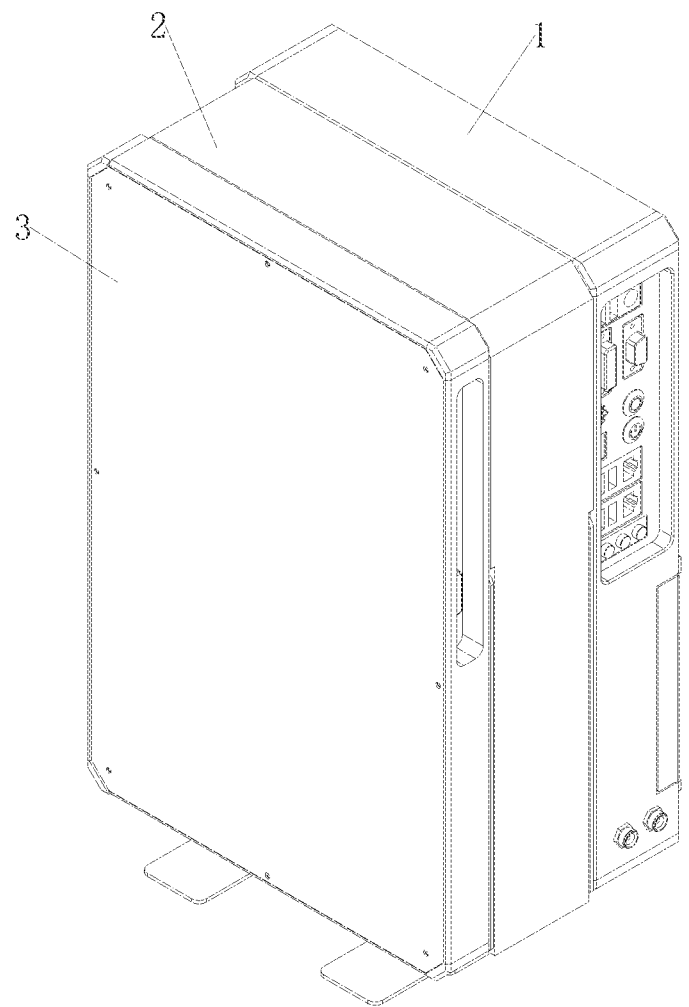
FIG. 1 shows the three-dimensional diagram of the disclosure.
Figure 2:
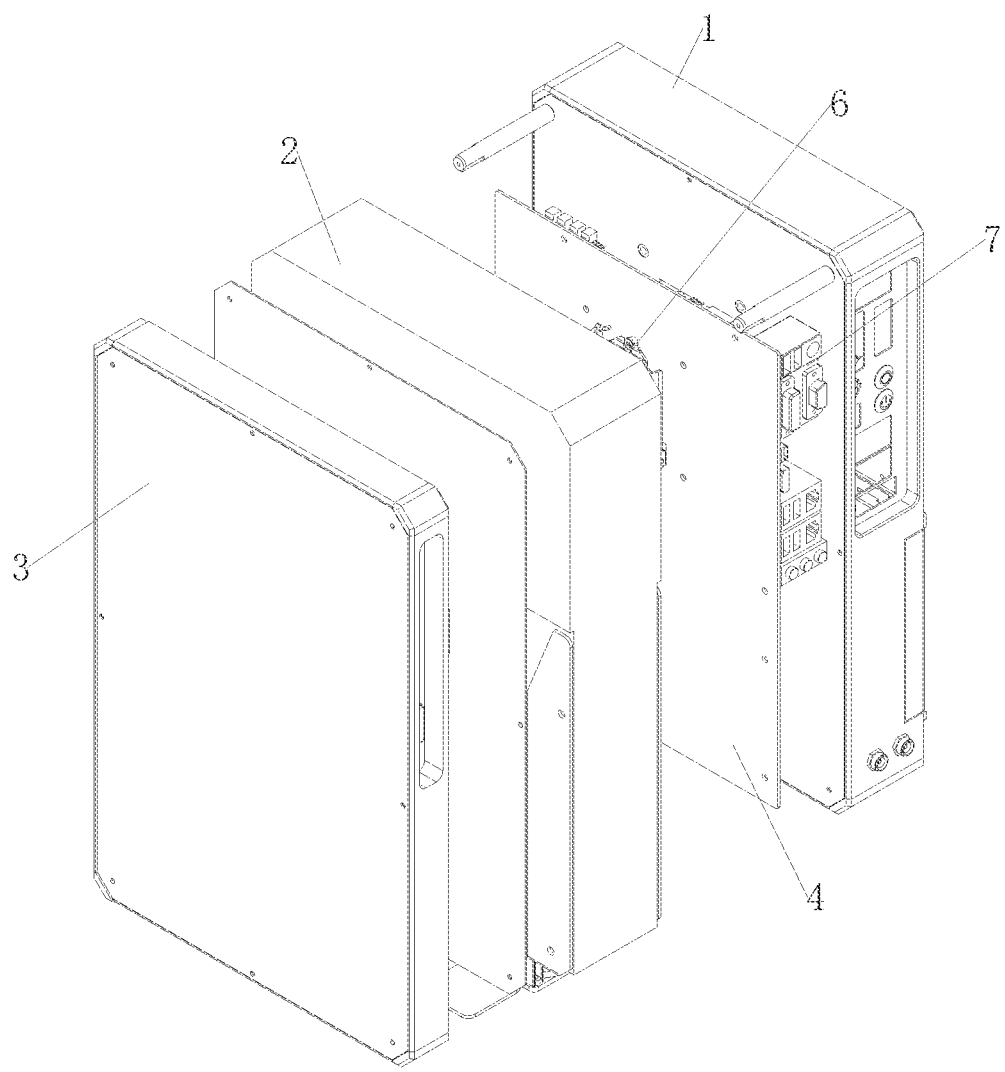
FIG. 2 shows a first exploded view of the disclosure.
Figure 3:
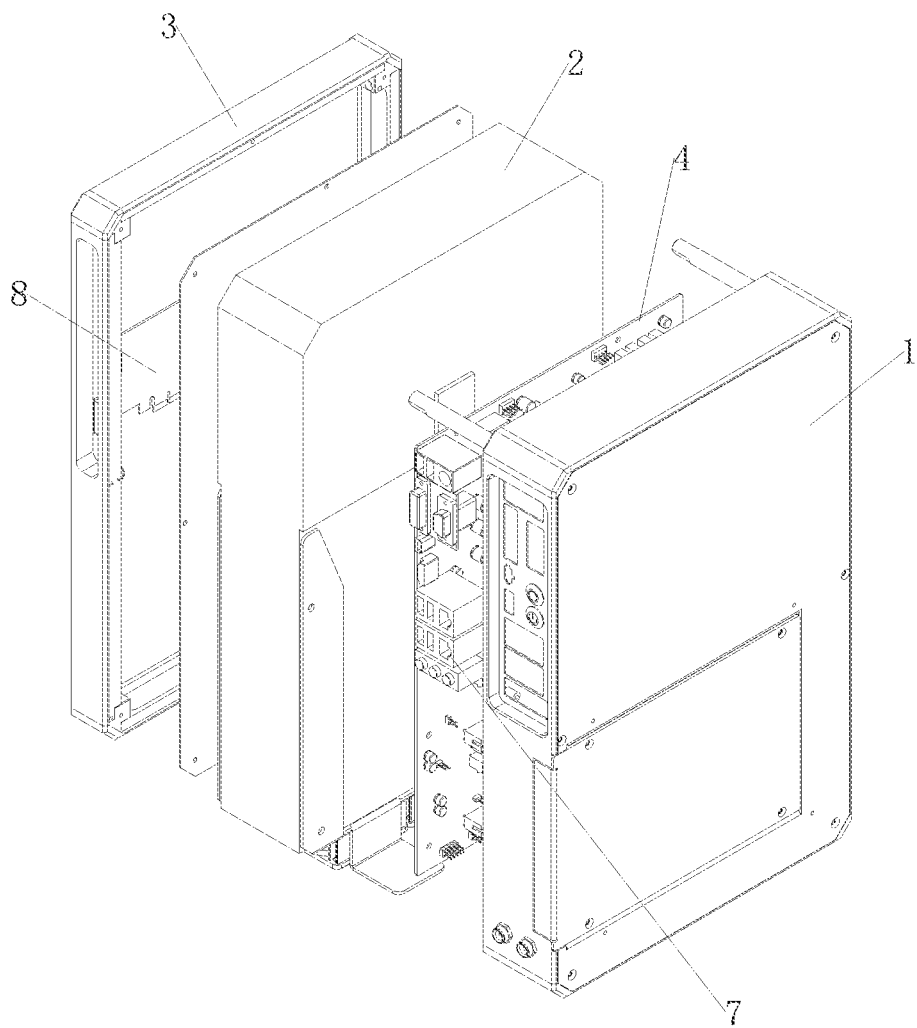
FIG. 3 shows a second exploded view of the disclosure.
Figure 4:
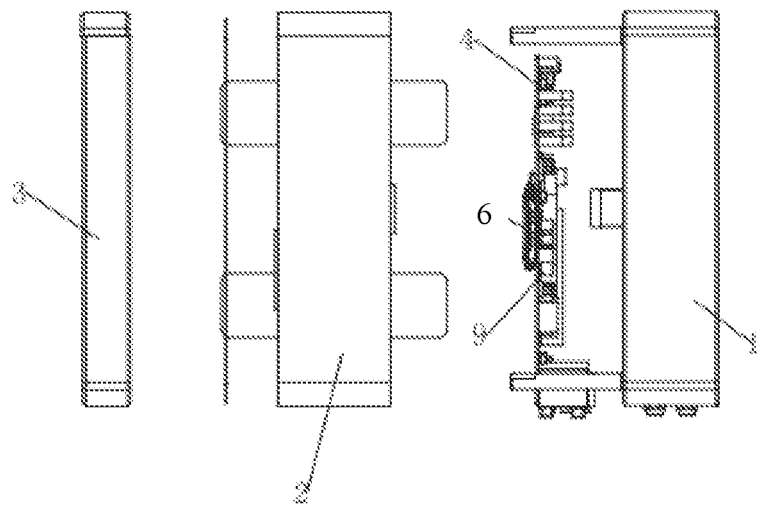
FIG. 4 shows a third exploded view of the disclosure three.
Figure 5:
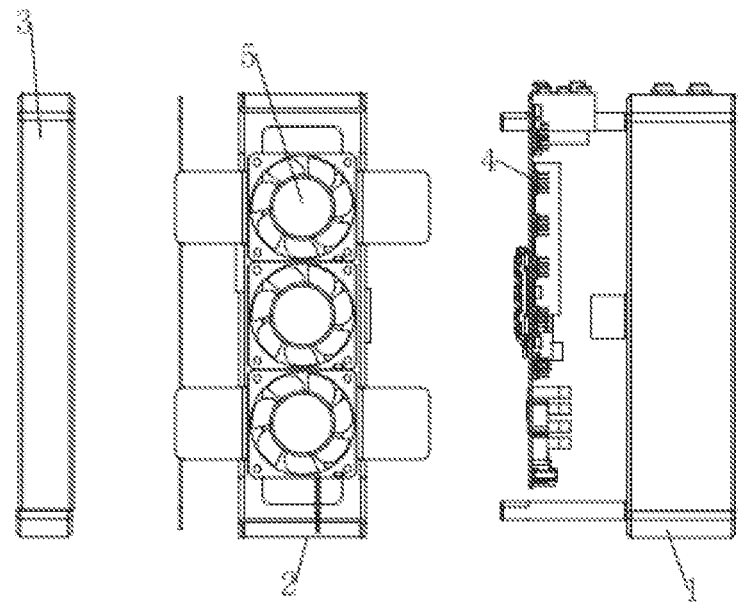
FIG. 5 shows a fourth exploded view of the disclosure.

| | |
|---|---|
| 1. First chassis | 2. Second chassis |
| 3. Third chassis | 4. Computer motherboard |
| 5. Cooling fan | 6. CPU |
| 7. Peripheral interface | 8. Graphics card |
| 9. Hard disk | |

DETAILED DESCRIPTION

In order to make the purpose, technical solution and advantages of the disclosure clearer, the disclosure, combined with drawings and embodiments, will be further detailed. It should be understood that the specific embodiments described herein are intended only to explain the disclosure and are not intended to qualify the disclosure.

In addition, in the description of the application, the terminology used should be understood in a broad sense, and for the technical staff in the field, the specific meaning of the term may be understood in the context of the actual circumstances. For example, the terms "provide" and "arrange" used in this application may be defined as contact settings or contactless settings, etc., and the azimuth terms used are based on reference sits or in the direction defined by the actual situation and common sense.

As an aspect of the disclosure, an air cooling structure of a computer chassis includes: a first chassis 1, a second chassis 2, a third chassis 3, a computer motherboard 4, and a cooling fan 5; the first chassis 1, the second chassis 2, and the third chassis 3 are provided in turn; the computer motherboard 4 is provided in the first chassis 1, a CPU 6 is provided on the side surface of the computer motherboard 4 towards the second chassis 2, a peripheral interface 7 is provided on the side surface of the computer motherboard 4 far away from the second chassis 2, a cooling hole is provided on the second chassis 2, the cooling fan 5 is provided in the second chassis 2, a graphics card 8 is provided in the third chassis 3.

Preferably, a hard disk 9 is provided on the side face of the computer motherboard 4 towards the second chassis 2. In another embodiment, preferably, a hard disk is provided in the third chassis 3.

In the above technical solution, the first chassis 1, the second chassis 2, and the third chassis 3 could be independently produced, and provided on the side of the computer board 4 towards the second chassis 2 through heating elements, such as CPU, etc. . . . , the peripheral interface 7 is provided on the side surface of the computer motherboard 4 far away from the second chassis 2, the third chassis 3 is provided with the graphics card 8, thus reducing the cooling system from two processes in the art to one process in this disclosure. Therefore, the cooling process is simplified and direct, in terms of computer systems, dissipation could be shared.

Firstly, the high heating element CPU and the peripheral interface 7 connected with the external signal are provided on both sides of the computer board 4 respectively, while the heating surface is oriented towards the second chassis 2 of the system middle zone so as to centralized process dissipation. This position adjustment of heat source fundamentally solves the problem of high density and local hot spot. Another side of the second chassis 2 can be arranged with heating components such as graphics cards through a transfer cord so as to make the middle zone of cooling system more efficient.

Secondly, a physical isolation from other components of the chassis is formed through the computer motherboard 4 in order to create a convenient space and direction for dissipation of the middle zone. A throughway middle zone makes it easier to plan and combine an unblocked heat flowing channel.

As a result of the above-mentioned technical solution, the disclosure improves the spatial location relationship of the chassis, and ensures that the middle zone cooling system has a clear internal zone isolation independence and external openness. On one hand, it makes the zone isolation more convenient to dissipate heat, and fully reflects the higher safety and reliability. On the other hand, due to the openness, it provides facilitating conditions for the natural cooling, has a wider range of application areas, reduces cooling cost of the overall product, and increases cooling efficiency. Under the same conditions, the cooling energy consumption will be lower; moreover, due to the elimination of the process of heat introduction, the failure is reduced greatly; some of the negative effects (noise, dust, energy consumption) generated by the process of heat introduction will no longer exist.

Because of the openness and specific function of the middle-zone cooling system, the disclosure, the cooling becomes more efficient. At the same time, the cooling mode will not be limited by other systems, and the cooling measures becomes more flexible and diverse, so that the adverse effects on electronic components caused by system waste heat aggregation and cooling effect are fundamentally eliminated, which can greatly improve the maintenance efficiency of the system, facilitate the expansion and capacity of the computer system, and greatly reduce the cost of building the computing system engineering. In addition, the throughway middle zone is easier to plan unimpeded wind channels, can reflect a higher safe and reliable value if the water cooling system is used. Heat components, such as graphics cards, and hard disks etc. . . . , could be arranged on the other side of the middle-zone cooling system so as to make the middle-zone cooling system more efficiently. The above-mentioned zone isolation and openness can be directly expanded and combined to form a large-scale computing system, all kinds of line planning is more concise, the construction costs and operating and maintenance difficulties of the computer room are greatly reduced.

Compared with the cooling technology in the art, the independence and openness of the middle cooling system reduces the cooling cost of the whole product, and improves the cooling efficiency. The disclosure does not need to increase direct costs, and can maintain compatibility, so that the construction costs and operating costs of the computer room with the same size and performance requirements using this disclosure can now be reduced to half.

The embodiments described above represent only a few embodiments of the disclosure, its description is more specific and detailed, but cannot be understood as a limitation on the scope of the patent of the disclosure. It should be pointed out that for ordinary technical personnel in the art, without departing from the concept of the disclosure, you can also make a number of deformations and improvements, these are the scope of protection of the disclosure. Therefore, the scope of protection of the patent of the disclosure shall be subject to the attached claim.

What is claimed is:

1. An air cooling structure of a computer chassis comprising: a first chassis, a second chassis, a third chassis, a computer motherboard, and a cooling fan; wherein, the first chassis, the second chassis, and the third chassis are provided in turn; the computer motherboard is provided in the first chassis, a CPU is provided on a first side surface of the computer motherboard towards the second chassis, a peripheral interface is provided on a second side surface of the computer motherboard opposite the first side surface of the computer motherboard towards the second chassis, the cooling fan is provided in the second chassis, a graphics card is provided in the third chassis.

2. The air cooling structure of the computer chassis according to claim 1, wherein a hard disk is provided on the first side surface of the computer motherboard towards the second chassis.

3. The air cooling structure of the computer chassis according to claim 1, wherein a hard disk is provided in the third chassis.

* * * * *